March 31, 1925.

W. FERRIS

BROACHING MACHINE

Filed Jan. 19, 1923

INVENTOR.
WALTER FERRIS
ATTORNEY.

March 31, 1925.
W. FERRIS
BROACHING MACHINE
Filed Jan. 19, 1923    4 Sheets-Sheet 2

1,532,107

INVENTOR.
WALTER FERRIS
BY Ralph W. Brown
ATTORNEY.

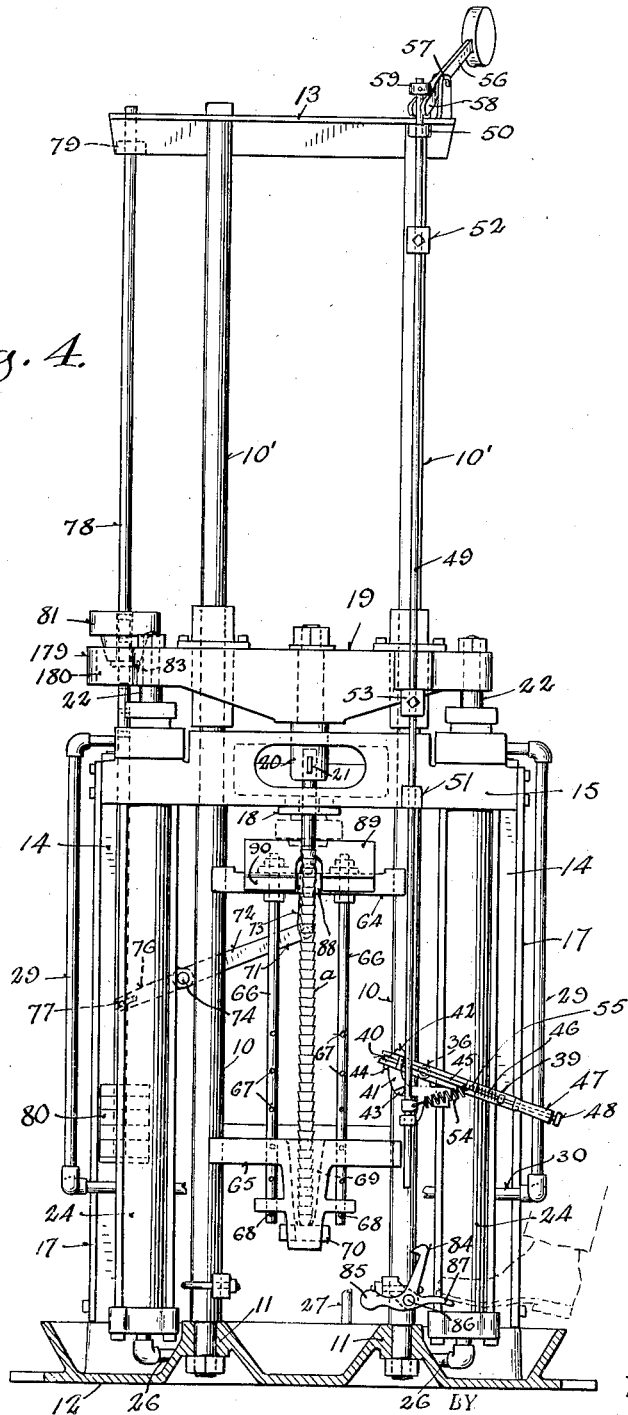

March 31, 1925.

W. FERRIS

BROACHING MACHINE

Filed Jan. 19, 1923 4 Sheets-Sheet 4

INVENTOR.
WALTER FERRIS
BY
ATTORNEY.

Patented Mar. 31, 1925.

1,532,107

UNITED STATES PATENT OFFICE.

WALTER FERRIS, OF MILWAUKEE, WISCONSIN, ASSIGNOR TO THE OILGEAR COMPANY, OF MILWAUKEE, WISCONSIN, A CORPORATION OF WISCONSIN.

BROACHING MACHINE.

Application filed January 19, 1923. Serial No. 613,600.

*To all whom it may concern:*

Be it known that I, WALTER FERRIS, a citizen of the United States, residing at Milwaukee, in the county of Milwaukee and State of Wisconsin, have invented a certain new and useful Improvement in Broaching Machines, of which the following is a full, clear, concise, and exact description, reference being had to the accompanying drawings, forming a part of this specification.

This invention has, primarily, to do with broaching machines of the vertical type, although certain novel features thereof may be advantageously employed in machines of other types.

One general aim of the present invention is to simplify and improve the construction and operation of broaching machines.

A more specific object is the provision of mechanism for automatically manipulating the tool before and after a working stroke so as to avoid the usual manual manipulation thereof by the operator.

Another object is the provision of a novel arrangement of parts, such that work handling methods involved in machines of this character may be simplified and improved.

Another object is the provision of improved means for operating and controlling the tool actuating means.

Other objects and advantages will appear from the following description of an illustrative embodiment of the present invention.

In the drawings:

Figure 4 is a front elevation of the machine showing the position of the parts at the beginning of a working stroke.

Figure 1:
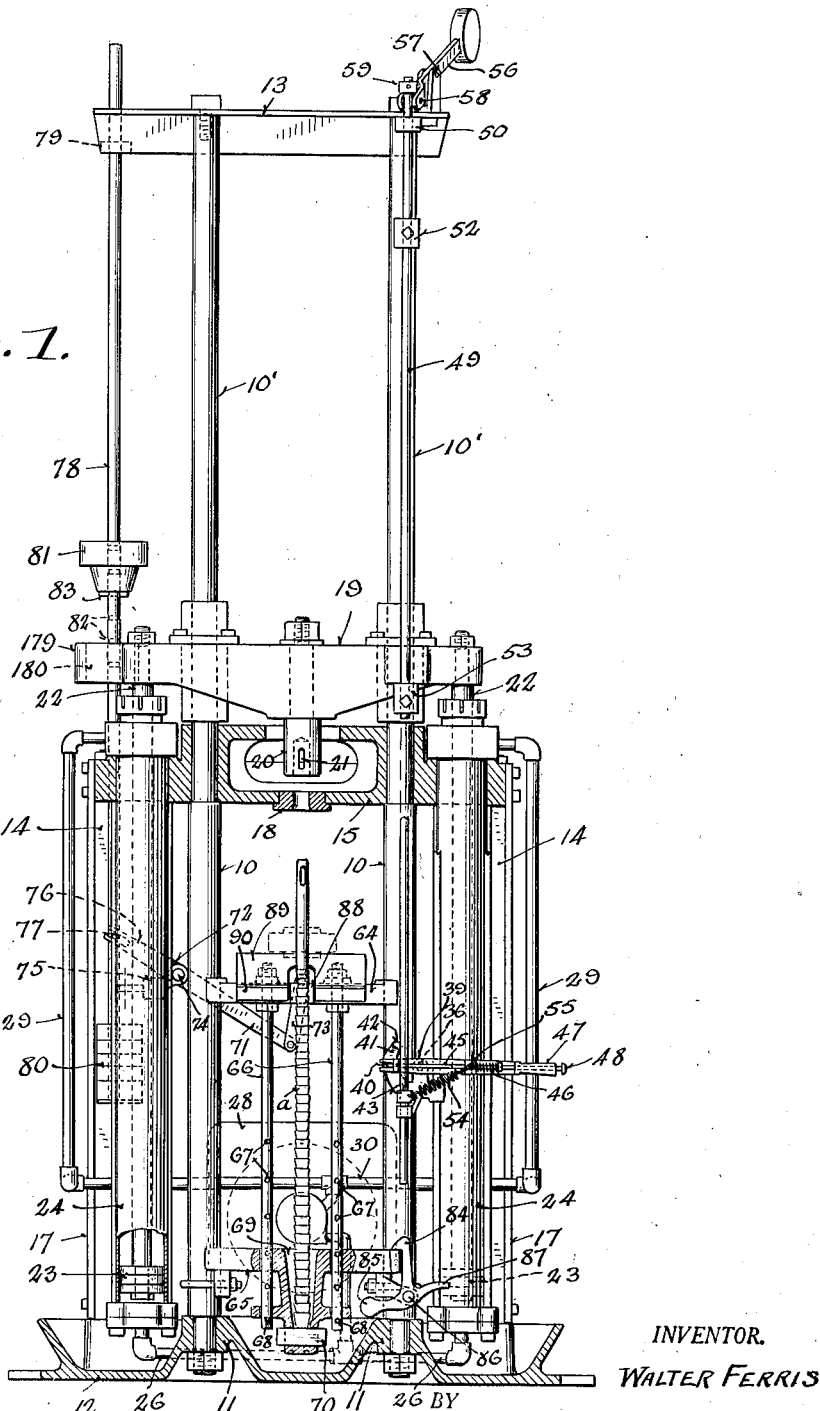
Figure 1 is a front elevation, partly in section, of a vertical broaching machine constructed in accordance with the present invention.

The machine selected for illustration comprises a frame having a pair of forward columns 10 anchored in appropriate lugs 11 formed on a base plate 12, the upper ends of the columns being rigidly connected by a tie-bar 13. A pair of rear columns 14, also anchored in the base plate, cooperate with the forward columns to provide an appropriate support for a fixed bed plate 15 disposed intermediate the length of the forward columns. The entire frame is braced by suitable diagonal bars 16 and 17. The bed plate 15 is provided with an opening, through which the tool *a* travels and in which the usual face plate bushing 18 is seated in a manner well known. The base plate 12 is preferably fashioned as indicated to form a catch basin for receiving the oil that drips from the tool and other parts during operation.

The tool is actuated by a cross-head 19 mounted for vertical reciprocation above the bed plate 15 and along the upper portions 10' of the columns 10 which serve as guide rods for this purpose. This cross head carries a socketed draw head 20 of well known form having the usual slot 21 through which the usual cross key is inserted for connection with the tool. In the machine shown, the cross head is connected with and actuated by a pair of fluid actuated plungers 22, disposed on opposite sides of the draw head 20. These plungers are connected with pistons 23, each operating within a double acting cylinder 24, secured to and depending from the bed plate 15.

Each cylinder 24, at its lower end, communicates through a branch conduit 26 with a main conduit 27 connected to one side of a pump 28, while the upper end of each cylinder 24 communicates through a branch conduit 29 with a main conduit 30 connected to the other side of the pump. The pump shown is a constant speed, reversible, variable displacement pump of the type described in my copending application, Serial No. 596,967, filed October 26, 1922. As therein described, the pump is controlled by a lever 31 (Figs. 2 and 3) so arranged that when in neutral position pump displacement is zero, and when adjusted in either direction from neutral the pump causes a flow of liquid through conduits 27 and 30 in one direction or another and at a rate dependent upon the direction and extent of such adjustment.

In the machine illustrated, the lever 31 is actuated and controlled by mechanism which will now be described. The lever is pivotally connected with a bar 32 mounted for longitudinal reciprocation in a block 33 fixed to the side of the pump. This bar is connected through a link 34 with a crank arm 35 fixed to one end of a rock shaft 36, journaled in appropriate fixed bearings 37 and 38. A control lever 39, fixed intermediate its ends to the other end of the rock shaft 36, is provided at one end with a latch pin 40 cooperating with a fixed quadrant 41 formed as an integral part of the bearing 38. The quadrant is provided with end stops 42 and 43 for limiting the swing of the lever 39 and with an intermediate ratchet tooth 44. The latch pin 40 is carried and controlled by a push rod 45 mounted for lengthwise reciprocation upon lever 39, and yieldably retained by a spring 46 in such position that the latch pin bears upon the quadrant. The arrangement is such that the lever 39 is free to swing in a counter-clockwise direction (Fig. 1) from one extreme position to another, but when swung in a clockwise direction from an extreme position, the pin 40, by engaging the ratchet tooth 44, normally prevents movement of the lever beyond neutral position. The lever 39 is also provided with an operating handle 47 and a push button 48 conveniently arranged to release the latch pin 40 from engagement with the tooth 44, so that the lever may be swung to any position desired between the limits defined by the stops 42 and 43. Thus it will be seen that the position of lever 31 is determined by the position of lever 39 through the mechanical connections, including the rock shaft 36, crank arm 35, link 34 and bar 32. It will also be understood that when lever 39 is in neutral position, lever 31 is also in neutral position and the pump displacement is zero. Similarly, when lever 39 is shifted into either extreme position, lever 31 is correspondingly shifted and the pump causes a flow of liquid through conduits 27 and 30 in a direction dependent upon which extreme position is assumed.

The position of lever 39 in this instance is placed under the control of the reciprocating cross head 19 by mechanism similar to that described in the copending application above referred to. This mechanism includes a vertical detent rod 49 mounted for longitudinal reciprocation in appropriate brackets 50 and 51 carried by the tie-bar 13 and bed plate 15, respectively. A pair of lugs 52 and 53 are adjustably fixed to the rod 49 and project into the path of movement of the cross head. The lower end of rod 49 is connected to one end of a coil spring 54, the other end of which is connected as at 55 to the lever 39. The arrangement is such that when rod 49 is in a lower extreme position, such as that shown in Figure 1, the spring 54 tends to swing lever 39 in a clockwise direction, and when the rod is in its upper extreme position the spring tends to swing the lever in a counter-clockwise direction. The weight of the rod 49 is preferably counterbalanced by any appropriate means, such as a weighted lever 56, pivotally mounted as at 57 upon the tie-bar 13, and having a forked end 58 embracing the upper end of the rod and engageable beneath a collar 59 fixed thereto.

Figure 2:
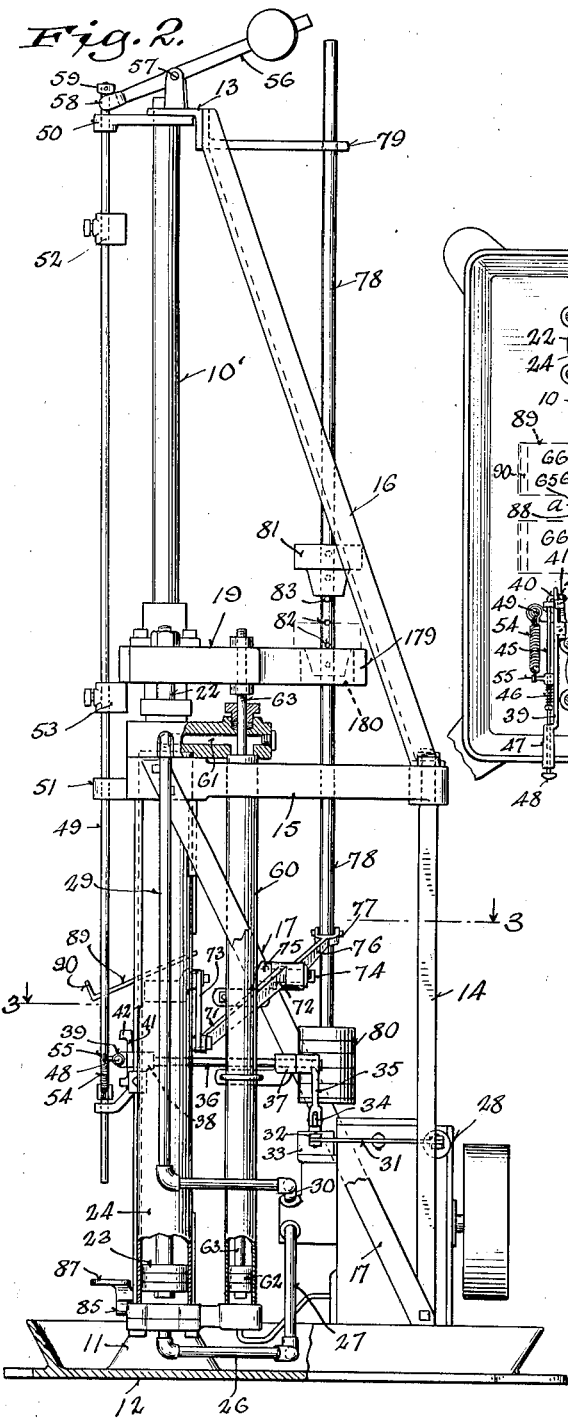
Figure 2 is a side elevation, partly in section, of the machine of Figure 1.
Figure 3:
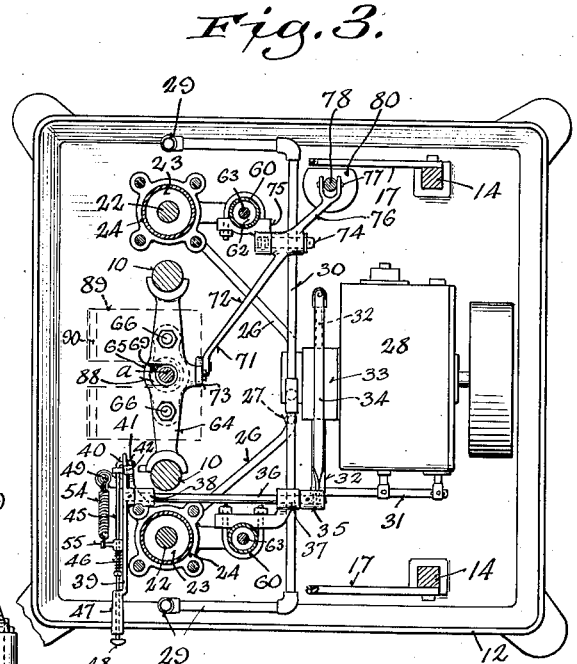
Figure 3 is a horizontal sectional view taken substantially on the line 3—3 of Figure 2.
Figure 6:
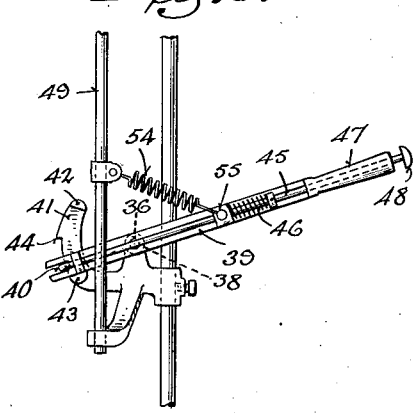
Figure 6 is a detail of a portion of the control mechanism.

Before a working cycle, the parts are normally in the position shown in Figures 1 and 2, wherein the lever 39 is retained in neutral position, under the tension in spring 54, by the engagement of the latch pin 40 with the ratchet tooth 44. In this position of the parts, the pump is operating at zero stroke and there is no flow of liquid in the conduits 27 and 30. When the latch pin is released, however, by pressure applied to the button 48, the lever 39 is free to move in a clockwise direction into the extreme position shown in Figure 4, and in so doing, so shifts the pump control lever 31 that the pump begins to deliver liquid under pressure through conduit 27 and branch conduits 26 to the lower ends of cylinders 24, thus causing an upward travel of the pistons 23, plungers 22 and cross head 19. In the meantime, liquid from the upper ends of the cylinders 24 is returned to the pump through the branch conduits 29 and conduit 30. As the cross head approaches the upper limit of its stroke, it contacts with the upper lug 52 on the rod 49, thus lifting the rod and consequently the spring 54. When this occurs, the lever 39 is suddenly shifted in a counter-clockwise direction into its other extreme position (see Figure 6), thereby so shifting the pump control lever 31 that the pump begins the delivery of liquid through conduit 30 and branch conduits 29 to the upper ends of the cylinders 24 and the cross head begins its downward stroke, the liquid in the lower ends of the cylinders returning to the pump through branch conduits 26 and conduit 27.

In order to maintain a substantially constant volume of liquid in the hydraulic circuit at all times, auxiliary cylinders 60 are provided to compensate for the liquid displaced by the plungers 22 within the cylinders 24. The arrangement and function of these auxiliary cylinders is substantially identical with that of the corresponding cylinders fully described in the application hereinabove referred to. Each communicates at its upper end through a port 61 with the upper end of a cylinder 24, and each encloses a piston 62 connected with the cross head 19 through a piston rod 63.

The machine shown also includes mechanism for manipulating the broaching tool between working strokes. This mechanism comprises a tool carrying frame having an upper cross head 64 mounted for vertical reciprocation upon the lower portion of the columns 10, and supporting a similarly mounted lower cross head 65, through appropriate tie-rods 66. These tie-rods are fixed to and depend from the upper cross head 64 and extend through the lower cross head, the lower ends having a series of perforations 67 adapted to selectively receive retaining pins 68 upon which the lower cross head rests. The lower cross head is provided with a tool receiving socket 69 having in the base thereof a block 70 of wood or other appropriate cushioning material to receive the impact of the tool as it drops from the tool draw-head.

The upper cross head 64 is supported upon one end 71 of a lever 72 by means of a link 73 connected to the lever and cross head. This lever is mounted to rock about a horizontal stub-shaft 74 fixed in a block 75 secured to one of the auxiliary cylinders 60. The other end 76 of lever 72 is pivotally connected as at 77 with and supports a vertical rod 78 arranged for longitudinal reciprocation in the bed plate 15 and in a bracket 79 fixed to the tie-bar 13. This rod 78 carries at all times a series of weights 80 which tend to but do not completely counterbalance the weight of the tool carrying frame just described. Another weight 81 is also loosely mounted on the rod 78, within the path of movement of a horizontal extension 179 of the reciprocating cross head 19. Extension 179 is provided with an opening 180 through which the rod 78 loosely extends. A series of perforations 82 are provided in the rod 78 for selectively receiving a pin 83 adapted to engage and sustain the weight 81 when the cross head 19 is in its lowermost position. Weights 80 and 81 together are sufficient to overbalance the weight of the tool carrying frame, so that as long as the weight 81 rests upon its pin 83, the rod 78, acting through the lever 72, tends to lift the tool carrying frame into its upper limiting position. As the cross head 19 advances upwardly on a working stroke, the extension 179 engages the weight 81 and lifts it from the pin 83 so that the rod 78 no longer supports this weight. When this occurs, the weight of the tool carrying frame is sufficient to overbalance the weight of the rod 78 with its weights 80 and the frame moves downwardly by gravity into its lowermost position where it is normally retained by a latch 84 of appropriate form. The latch shown comprises a weighted lever 85 pivoted at 86 and provided with a pedal 87 by which it may be rocked from its normal latching position by the foot of the operator.

The upper cross head 64 of the tool carrying frame is preferably transversely slotted, as indicated at 88, to permit the ready insertion and removal of the tool. This cross head is also preferably provided with an inclined work receiving tray 89 correspondingly slotted and having at its lower edge an upturned flange 90 for retaining the work thereon.

A brief description of a complete working cycle will now be given. With the tool carrying frame normally in the lower position shown in Figure 1, the broaching tool $a$ is placed therein, as indicated, with its lower end resting upon the block 70 in the lower cross head 65 and extending upwardly through the slot 88 of the upper cross head 64. In this position, there is sufficient space between the bed plate 15 and the upper end or nose of the tool to permit the work to be passed thereover and onto the tool. The latch 84 is then released by depressing the pedal 87 and the tool carrying frame moves upwardly under the influence of the rod 78 and weights 80 and 81 through the lever 72, thus advancing the nose of the tool up through the bushing 18 and into the socketed draw-head 20. The tool is then secured to the draw-head by passing the usual cross-key through the slot 21.

Figure 5:
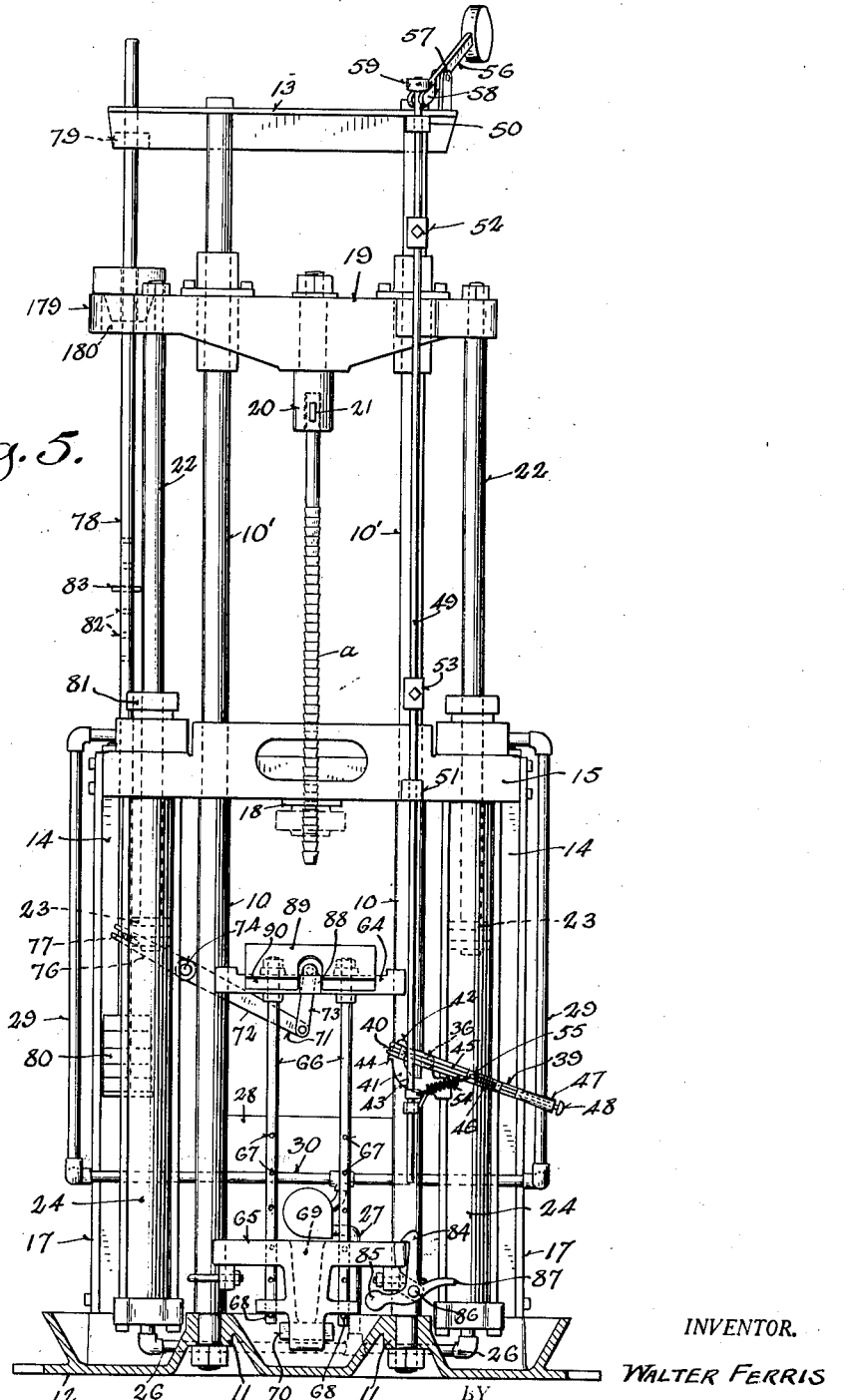
Figure 5 is a front elevation showing the position of the parts before the end of a working stroke.

The machine is then set to begin a working stroke which is effected as above described, by depressing the button 48 on the lever 39 and permitting the lever to swing in a clockwise direction to the position shown in Figure 4. As the cross head 19 advances upwardly, the tool is drawn through the work and the weight 81 on the rod 78 is lifted away from the pin 83 by the extension 179 of the cross head, as indicated in Figure 5. When this occurs the tool carrying frame again returns by gravity to its lowermost position indicated in Figures 1 and 4.

The cross head 19 continues its upward advance on its working stroke until the tool has been drawn completely through and free of the work, at which time the work is free to drop by gravity onto the inclined tray 89 from which it may be removed at the convenience of the operator.

At the upper limit of its stroke, the direction of movement of the cross head 19 is automatically reversed as above explained by its action upon the rod 49, spring 54 and lever 39. During its downward movement or return stroke the cross head 19, of course, redeposits the weight 81 upon the pin 83 carried by rod 78, so that the rod 78 is again ready to effect an upward movement of the tool carrying frame as soon as the latch 84 is released.

As the crosshead 19 approaches the lower limit of its return stroke it engages the lower lug 53 and forces the rod 49 and spring 54 downwardly. When this occurs, the lever 39 is suddenly shifted by the spring into the neutral position of Figure 1 where it is retained by the latch pin 40 and ratchet tooth 44 on the quadrant. This, of course, brings the cross head to rest. The tool is then released from the draw head and permitted to drop by gravity into the tool carrying frame, where it is again ready to receive a fresh piece of work in preparation for the next working cycle.

Various changes may be made in the embodiment of the invention hereinabove described, without departing from or sacrificing any of the advantages of the invention as defined in the appended claims.

I claim:

1. In a vertical broaching machine the combination of a face plate for sustaining the pressure of the work, a tool draw head mounted for vertical reciprocation above said face plate, and fluid actuated means beneath said face plate for actuating said draw head.

2. In a vertical broaching machine the combination of a face plate, a tool draw head mounted for vertical reciprocation above said face plate, means including a plurality of cylinders beneath said face plate for actuating said draw head, and means for delivering a driving fluid to said cylinders.

3. In a vertical broaching machine the combination of a bed plate for sustaining the pressure of the work, a vertically reciprocating crosshead above said bed plate having a tool draw head, plungers connected with said cross head and extending beneath said bed plate, and hydraulic means beneath said bed plate for driving said plungers.

4. In a vertical broaching machine the combination of a face plate for sustaining the pressure of the work, a tool draw head above said face plate, and means actuated from beneath said face plate for producing relative reciprocation vertically between said face plate and draw head.

5. In a vertical broaching machine the combination of a face plate for sustaining the pressure of the work, tool actuating means above said face plate, and tool manipulating means beneath said face plate for lifting the tool into engagement with said actuating means before a working stroke and for receiving said tool after a working stroke.

6. In a vertical broaching machine the combination of a face plate, tool engaging means above said face plate, means for producing relative reciprocation vertically between said face plate and said engaging means to perform a working stroke, and tool manipulating means beneath said face plate for lifting the tool into engagement with said engaging means before a working stroke and for receiving the tool therefrom after a working stroke.

7. In a broaching machine the combination of means for producing relative reciprocation between the tool and work to perform a working stroke, a source of power for actuating said means, and separately actuated tool manipulating means for advancing the tool into operative engagement with said first named means before the working stroke and for receiving the tool therefrom after the working stroke.

8. In a broaching machine the combination of tool reciprocating means, and gravity actuated means for delivering the tool to said tool reciprocating means.

9. In a broaching machine the combination of tool reciprocating cross head, means for delivering the tool to said cross head, and means rendered operative by said cross head for actuating said tool delivery means.

10. In a broaching machine the combination of a tool reciprocating cross head, means for delivering the tool to said cross head, means rendered operative by said cross head for actuating said tool delivery means, and means controlled by the operator for controlling the operation of said tool delivery means.

11. In a broaching machine the combination of tool actuating means, hydraulic means including a reversible pump for driving said actuating means, and means controlled by said tool actuating means for reversing said pump at the end of a working stroke and for terminating the flow of fluid from said pump at the end of a return stroke.

12. In a broaching machine the combination of a tool reciprocating cross head, hydraulic means including a reversible pump for actuating said cross head, means controlled by movement of said cross head for reversing said pump at the end of a working stroke and for terminating the flow of fluid from said pump at the end of a return stroke, and means under the control of the operator for initiating a working stroke.

13. A vertical pull broaching machine having a draw head operable to pull the tool upwardly during a working stroke and a face plate below said draw head for sustaining the pressure of the work during a working stroke and for ejecting the work after a working stroke.

14. In a vertical broaching machine the combination of a tool draw head mounted for vertical reciprocation, driving means therefor, a member beneath said draw head for receiving the pressure of the work against the under face thereof, and means beneath said member for receiving the work as it falls therefrom after a working stroke.

In witness whereof, I hereunto subscribe my name this 6th day of January, 1923.

WALTER FERRIS.